Aug. 6, 1946. J. H. BOLLMAN 2,405,182
ULTRA-SONIC RANGING DEVICE
Filed Dec. 10, 1942 2 Sheets-Sheet 1
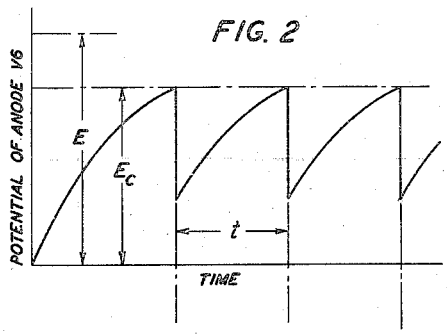
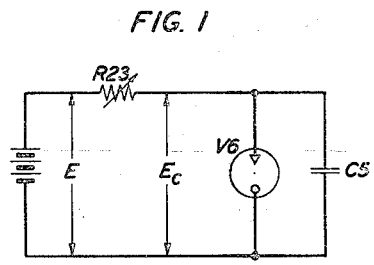
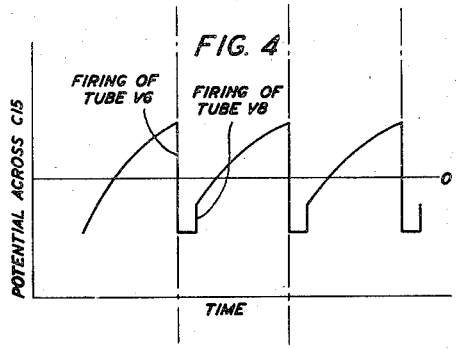
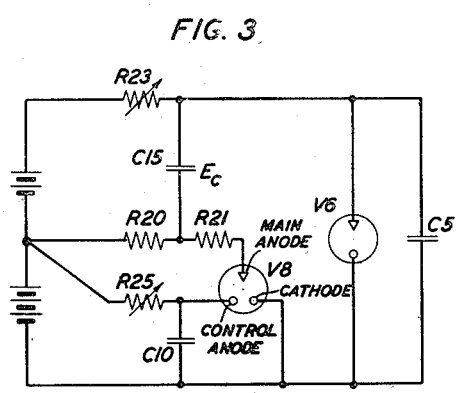
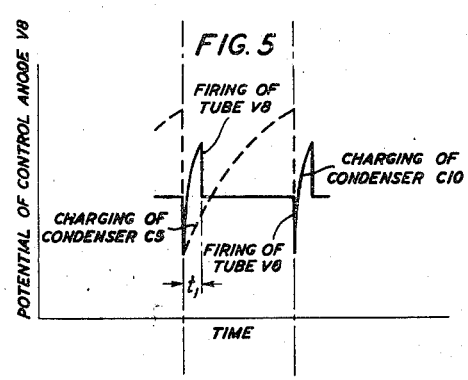
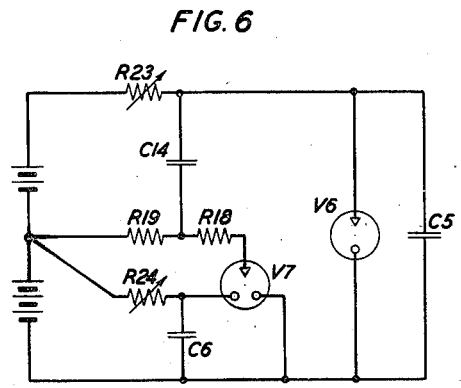
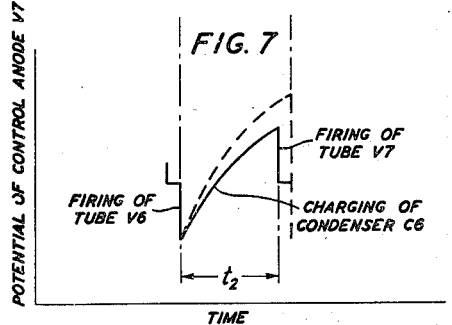
INVENTOR
J. H. BOLLMAN
BY
ATTORNEY

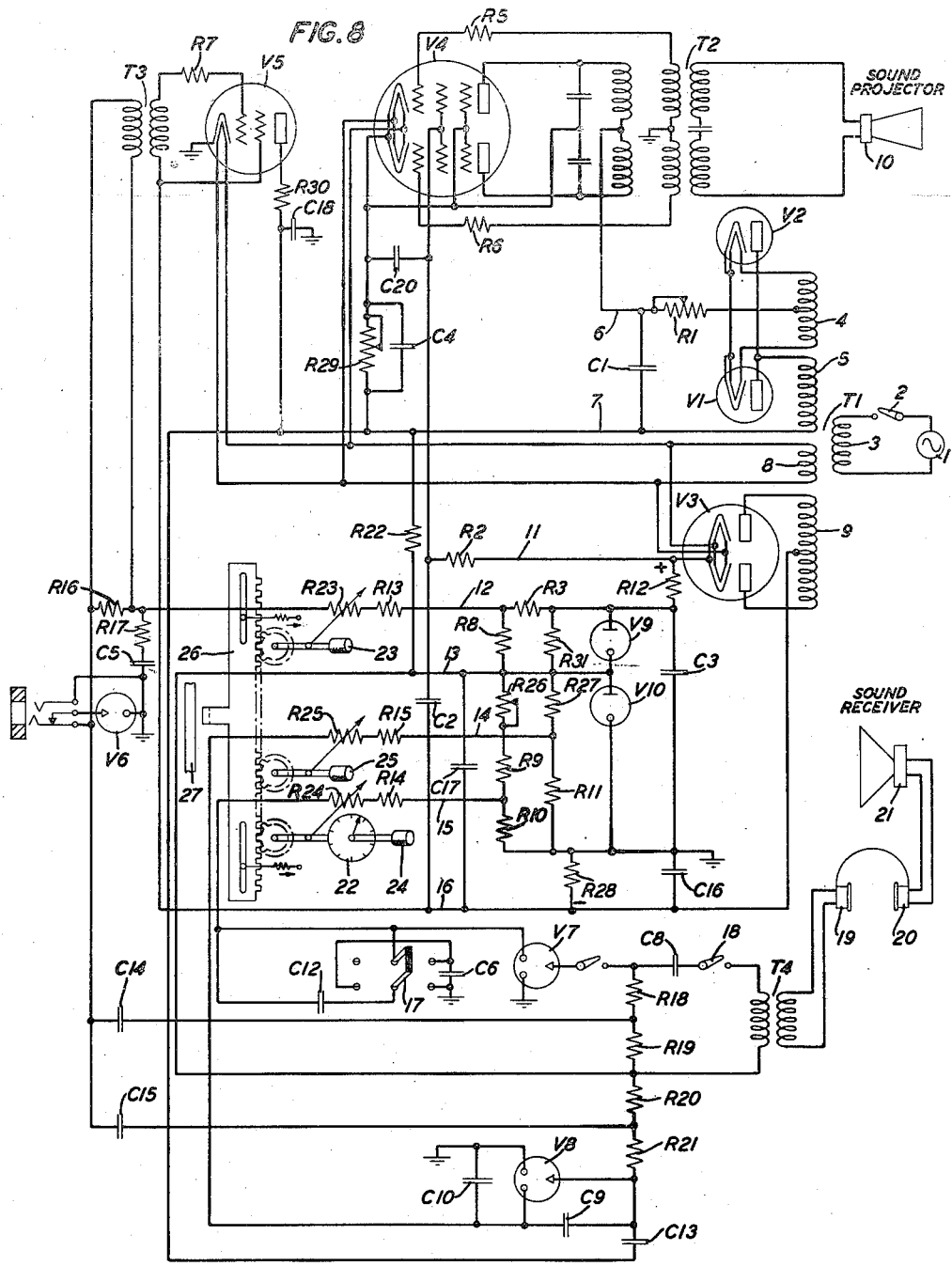

Patented Aug. 6, 1946

2,405,182

UNITED STATES PATENT OFFICE 2,405,182

ULTRASONIC RANGING DEVICE

John H. Bollman, Rutherford, N. J., assignor to Bell Telephone Laboratories, Incorporated, New York, N. Y., a corporation of New York Application December 10, 1942, Serial No. 468,532

4 Claims. (Cl. 177—386)

This invention relates to detecting and locating devices, and particularly to ultra-sonic echo ranging equipment.

In devices of this character distances may be measured by projecting a pulse of a frequency within or above the sound range and measuring the time of its travel from the time at which it is transmitted to the time it travels to an object to be located, is reflected therefrom and returns as an echo. The rate of travel being known, the distance to the object may be readily calculated. Such devices may be used to locate objects in the air or under water. For purposes controlled by various factors the ultra-sonic range is commonly used which generally means a range of frequencies between 15,000 and 40,000 cycles per second. By way of example, and in a preferred embodiment of the present invention a frequency of 25 kilocycles will be described in connection with a device for locating objects under the surface of the sea where it is known that sound of this frequency travels at the rate of 1,600 yards per second.

An object of the invention is to provide a compact, comparatively light-weight and economical equipment unit requiring a small amount of power for use on small boats.

Accordingly, an electronic tube device is provided having a combination of three timing circuits for starting and stopping the transmission of an ultra-sonic signal and for timing another signal used for comparison with the echo of the said supersonic signal. By the use of these timing circuits power which has been stored at a low rate for a comparatively long period may be delivered as a heavy surge for a comparatively short period to the generator of the ultra-sonic signal whereby strong signals may be transmitted for short intervals periodically.

A feature of the invention is an energy reservoir by which a large amount of power for a short interval is made available by the storage of power at a low rate over a comparatively long period. In the specific embodiment of the invention herein described a condenser is used as a storage means and which releases a comparatively great amount of power after being charged at a comparatively low rate. By such means the use of bulky and expensive primary sources of power is avoided. Where, by way of example, a surge of power of about two-tenths of a second duration once every six seconds is employed, the power may be derived from an economical source and the size and weight of the apparatus can be considerably reduced.

Timing circuits are provided, comprising generally relaxation oscillators whose rate of operation is controlled by a variable resistance and a condenser in a charging circuit. By varying the resistance element in the said charging circuit the rate of charging may be varied and hence the periodicity of the operation of the circuit. A first timing circuit is provided to place an ultrasonic signal generator into operation. The operation of this circuit at the same time starts a second and a third timing circuit into operation, the second being employed for generating a comparison signal and the third being employed for generating a stop signal. The comparison signal when its circuit is adjusted to make it coincide with the beginning of the ultra-sonic echo will indicate that the reading of a calibrated scale indicator on the comparison signal adjusting means is properly set and hence such reading will give the correct distance of the target. The stop signal will reverse the condition established by the first or start timing circuit and thus terminate the transmission of the supersonic signal. The rate of operation of the stop signal timing circuit thus determines the length of the transmitted ultra-sonic signal.

The start signal circuit operates periodically and independently of the other circuits and thus determines the periodicity of the echo ranging operation. The stop signal circuit and the comparison signal circuit, however, are dependent on the start signal circuit and both start their operation in response to the start signal.

The period of the stop signal is the shortest of the three periods measured, varying by way of example from eight-hundredths to three-tenths of a second. The time interval measured by the comparison signal is next in length, being much greater than the stop signal interval but only slightly shorter than the start signal timing. The three controls may be separately manipulated so that in the hands of an expert operator the different conditions may be adjusted to a fine degree and great accuracy in the determination of the distance sought can be attained.

As an alternative arrangement at the discretion of the operator and as illustrated herein as a preferred embodiment of the invention, the three controls may be manipulated simultaneously by a single dial. Thus as the interval of the comparison signal is changed the intervals of the start and stop signals will be changed accordingly, though the relative lengths of the various intervals will not be altered.

Another feature of the invention is, therefore, the use of a plurality of timing circuits all cooperating in a single circuit operation, each of which measures a different time interval and each having an interval varying control, in combination with a unitary controlling means for operating said controls, the arrangement being such that the relative lengths of the various time intervals measured remain substantially unaltered throughout the range of said unitary controlling means.

Other features will appear hereinafter.

The drawings consist of two sheets having eight figures, as follows:

Fig. 1 is a schematic circuit diagram showing a typical relaxation oscillator for timing the operational interval of the device;

Fig. 2 is a graph of the potential on the anode of the tube in the circuit of Fig. 1 showing the operational interval $t$;

Fig. 3 is another schematic circuit diagram showing the combination of two relaxation oscillators, the one shown in Fig. 1 and another for timing the interval over which a ranging signal is transmitted during an interval $t_1$;

Fig. 4 is a graph showing the potential variation across a condenser which acts to discharge the tube which controls the length of the time interval $t_1$;

Fig. 5 is a graph of the potential on the anode of the tube which controls the time interval $t_1$;

Fig. 6 is another schematic circuit diagram showing the combination of two relaxation oscillators, the one shown in Fig. 1 and another for timing the comparison signal transmitted at the end of an interval $t_2$;

Fig. 7 is a graph of the potential on the anode of the tube which controls the time interval $t_2$; and Fig. 8 is a detailed circuit diagram of the connections of the device of the present invention.

The operation of the circuit may be understood by the following description. Fig. 2 represents the fundamental operation of the timing circuit for controlling the rate of operation thereof or the frequency of the starting signal. The tube V6 as shown in Fig. 1 is included in a relaxation oscillation circuit. When such a circuit is established the condenser C5 charging through resistance R23 varies the potential across the tube V6 in accordance with the graph of Fig. 2. When the potential across the tube reaches the value $E_c$ the tube fires and the potential drops suddenly and then begins to build up again. The time $t$ between two firing points of the tube determines the rate of operation of this circuit, which depends in a manner well understood on the constants of the resistance R23 and the condenser C5. Since the resistance is variable the time $t$ may be controlled at will.

If this relaxation oscillator circuit is now included in a more complex circuit, as indicated in Fig. 3, another timing operation may be produced. If each of the sudden drops of potential indicated in Fig. 2 is employed as a start pulse, a stop pulse may be produced a definite time interval thereafter by the use of another tube, V8. The tube V8 being in a conducting state the resistances R20 and R21 constitute a potentiometer so that one plate of condenser C15 is held at a given potential. The other plate of the condenser C15 will vary with the potential of the anode of V6 which upon firing will bring such other plate of condenser C15 down to the level of its first plate connected to the potentiometer point between resistances R20 and R21. Condenser C15 being charged at this time will now discharge over resistance R20. The voltage across condenser C15 is shown by the graph of Fig. 4 and will be seen to follow the graph of Fig. 2 in its time elements. The complete action of the circuit of Fig. 3 is depicted in the graph of Fig. 5 which represents the potential of the control anode of tube V8. Therefore it will be seen that in a very short time after tube V6 fires and extinguishes tube V8 by reducing the potential on the point between resistances R20 and R21, a condenser, C10, charges and causes the firing of tube V8. This tube therefore becomes conducting again very shortly after it is extinguished and remains in this condition until condenser C5 charges to the firing point of V6, represented by the dotted line in Fig. 5. The comparatively long horizontal part of the graph of Fig. 5 represents the control anode potential of tube V8 while it is conducting.

The time $t'$ between the firing of tube V6 and the firing of tube V8 represents the time during which the outgoing signal is transmitted and the time $t—t'$ as represented by the horizontal portion of the graph of Fig. 5 represents the time over which energy is being stored at a low rate for dissipation in a short interval ($t'$) signal at a high rate. The firing of tube V6 represents a start signal and the firing of tube V8 represents a stop signal.

It will be noted that a resistance R25 and condenser C10 control the time interval $t'$.

Figs. 6 and 7 are similar to Figs. 3 and 5, respectively, and show the generation of the comparison signal generated by the firing of tube V7. The time interval $t^2$ between the firing of tube V6 and the firing of tube V7 is thus the interval which it takes for a signal to be transmitted and its echo received, when the proper adjustment is made so that the comparison signal coincides with the reception of the said echo. The time interval $t^2$ is controlled by resistance R24 and condenser C6.

It will be noted that the time interval $t$ is comparatively long, that the time interval $t^2$ is also long but somewhat shorter than $t$, and that the time interval $t'$ is comparatively short.

The variable resistances R23, R24 and R25 may be individually adjusted or they may be operated by a gang control as indicated in Fig. 8. In the latter case the relative lengths of the time intervals $t$, $t'$ and $t^2$ are maintained as described.

The complete operation of the device may be understood through the following description of the circuit diagram of Fig. 8. The device is connected by any usual means to a source 1 of alternating current and rendered effective by the closure of the switch 2. In this manner alternating current is connected to primary coil 3 of transformer T1 which has a plurality of secondary coils for supplying various potentials to different circuits. Thus coil 4 supplies filament current to tubes V1 and V2 and coil 5 acts as a source of power, rectified by the tubes V1 and V2 to charge the condenser C1 and to supply a direct current potential across conductors 6 and 7, the rate of charge being controlled by the resistance R1.

Coil 8 supplies filament current to tubes V3, V4 and V5 and coil 9 supplies power translated by tube V3 into direct current for charging condenser C2.

Condensers C1 and C2 are comparatively large capacity condensers and they act to store a large amount of power at a low rate during the interval $t—t'$, which is released at a high rate during the interval $t'$, to operate the sound projector 10 to send out a comparatively strong signal.

The tube V4 and the windings of the transformer T2 comprise an oscillator which is controlled by the tube V5, the tube V4 being known as a push-pull double pentode. Its control grids are connected to the outside terminals of one winding of the transformer T2 and its anodes are connected to the outside terminals of another winding of this transformer. The source of current which is represented by the condenser C1 connected to conductors 6 and 7 is connected between the anodes and cathodes of this tube and becomes effective when the potential of the screen grids is raised by the fully charged condenser C2, the control grids being held at a relatively high negative potential with respect to the cathode until tube V5 fires. Feedback to the control grids is provided by the middle winding of transformer T2 so that oscillations are set up in this tube and transformer circuit in accordance with well-known principles and an ultrasonic signal is transmitted by the transmitter 10.

Under normal conditions, during the interval $t—t_1$, or while the tube V5 is not conducting, the suppressor grids and the cathodes of tube V4 have comparatively small positive potential impressed thereon which may be traced from ground, the voltage regulator tube V10, resistance R22, the gain control or bias adjustment network comprising resistance R29 and condenser C4 to the supppressor grids and cathodes of tube V4. At the same time the screen grids of tube V4 have a positive potential supplied thereto from condenser C2 but since these positive potentials are both related to ground the effective positive potential of the screen grids is the difference between such screen grid potential and the said comparatively small positive potential on the cathodes and this is insufficient to enable the tube V4. Therefore the tube V4 remains inactive.

The tube V5 is a gas-filled tube and when it is fired through an impulse provided by the transformer T3 it provides a path of very low resistance from its anode to its cathode, and since its cathode is grounded the operation of tube V5 is then equivalent to grounding one terminal of low resistance R30. This substantially reduces the potential of the suppressor grids and the cathodes of tube V4, to ground potential, whereby the positive potential of the screen grids becomes relatively more postive and the negative potential of the control grids becomes relatively less negative, thus rendering the tube active.

Thereupon, in effect the condenser C1 discharges from the anodes of tube V4 to the cathodes thereof and the condenser C2 discharges from the screen grids to the cathodes with the result that the power output of the transformer T2 rises to a high value. The time values in this circuit are so adjusted that during the small interval $t_1$ during which this action takes place the charges on condensers C1 and C2 will not be exhausted but only depleted. The power taken out during this interval will then be restored at a low rate during the following interval $t—t_1$.

The tube V5 has its cathode at ground potential and its control grid and screen grid both at a comparatively low negative potential, that measured by the drop of potential across the resistance R28. This holds the tube non-operative under normal conditions. However, a connection between the control grid and the screen grid of V5 includes a winding of transformer T3. The other winding of this transformer is connected across the resistance R16 in the anode circuit of tube V6 so that when tube V6 fires, the sudden current flow in resistance R16 is translated into a positive pulse superimposed on the potential of the control grid of tube V5. This causes V5 to fire and since its internal resistance is very low it practically grounds the resistance R30 with the results hereinbefore described.

Now in a very short interval $t_1$ determined by V8 a negative pulse is transmitted by condenser C13 by the firing of tube V8 to the anode of tube V5. The potential of the control grid of this tube having returned to normal the tube is now quenched and the action of tube V4 is stopped.

The network of resistances R3, R8, R9, R10, R11, R12, R27, R28 and R31 comprises a potentiometer from which various taps, 11 to 16, inclusive, are taken to provide various potentials for the purposes needed in the circuit.

The tap 11 supplies a charging potential for the storage condenser C2 through a comparatively high resistance R2 whereby the rate of charge is low. Two voltage regulator tubes V9 and V10 are connected in this network to maintain steady potentials on the taps 12 and 13.

If ground is taken as a reference point, then the potentials of the taps 11 to 15 will be at various positive values and tap 16 will be a negative value.

Tap 12 leads to resistances R13 and R23 which control the relaxation oscillation circuit for tube V6 as explained in connection with Figs. 1 and 2.

Tap 14 leads to resistances R15 and R25 which control the relaxation oscillation circuit for tube V8 as explained in connection with Figs. 3, 4 and 5. Tap 15 leads to resistances R14 and R24 which control the relaxation oscillation circuit for tube V7 as explained in connection with Figs. 6 and 7. It may be noted that the condenser C6 of Fig. 6 actually consists of two condensers C12 and C6 controlled by a switch 17. When the switch 17 is thrown to the right these two condensers are connected in parallel so that the time interval $t_2$ becomes comparatively long as illustrated in Fig. 7. When the switch 17 is thrown to the left condensers C12 and C6 are in series and the time interval $t_2$ becomes comparatively short. Thus means is provided to detect targets at long and short ranges.

The firing of tube V7 produces a disturbance through condenser C8, switch 18 and transformer T4 which is translated into a click in the head receiver 19. A companion receiver 20 is connected to a means for detecting the echo of the signal projected by the sound projector 10, here shown schematically as sound receiver 21. The operator will adjust the three variable resistances R23, R24 and R25 either separately by the knobs 23, 24 and 25 or by a gang control until the click heard in receiver 19 coincides with the beginning of the echo heard in receiver 20. The setting of the gang control dial 22 will indicate the distance sought to be established. Such controls may be marked so as to indicate directly the distances measured. As shown schematically here, the rack 26 in its right-hand position will cause the simultaneous adjustment of R23, R24 and R25. If moved to the left and hooked over the part 27 the three resistances may be separately adjusted.

What is claimed is:

1. In a signaling system wherein a signal is transmitted and an echo thereof is received, a signal generator, an automatically operating circuit for periodically placing said signal generator in operation, a timing circuit for taking said signal generator out of operation, a timing circuit for generating a signal for comparison with the echo of the signal transmitted by said signal generator, said timing circuits being started in operation by said automatically operating signal generator starting circuit simultaneously with the starting in operation of said signal generator, and an individual time interval adjustment control for each of said three circuits.

2. In a signaling system wherein a signal is transmitted and an echo thereof is received, a signal generator, an automatically operating circuit for periodically placing said signal generator in operation, a timing circuit for taking said signal generator out of operation, a timing circuit for generating a signal for comparison with the echo of the signal transmitted by said signal generator, said timing circuits being responsive to said automatically operating circuit, an individual time interval adjustment control for each of said three circuits and a single means for simultaneously operating said individual controls.

3. In a signaling system wherein a signal is transmitted and an echo thereof is received, a signal generator, an automatically operating circuit for periodically placing said signal generator in operation, a timing circuit for taking said signal generator out of operation, a timing circuit for generating a signal for comparison with the echo of the signal transmitted by said signal generator, said timing circuits being responsive to said automatically operating circuit, an individual time interval adjustment control for each of said three circuits and a gang controller for operating said three individual controls constructed and arranged to maintain the relative time intervals of the said three circuits unchanged.

4. In a signaling system wherein a signal is transmitted and an echo thereof is received, a signal generator, a source of energy, an energy reservoir for operating said signal generator at a comparatively high rate, means for transferring energy from said source of energy to said reservoir at a comparatively low rate, an automatically operating circuit for periodically placing said signal generator in operation, a timing circuit for taking said signal generator out of operation, a timing circuit for generating a signal for comparison with the echo of the signal transmitted by said signal generator, said timing circuits being responsive to said automatically operating circuit, and means for controlling the periodicity of said automatically operating circuit and said timing circuits.

JOHN H. BOLLMAN.